United States Patent
Azuma

(10) Patent No.: US 11,458,790 B2
(45) Date of Patent: Oct. 4, 2022

(54) WORK VEHICLE

(71) Applicant: Kubota Corporation, Osaka (JP)

(72) Inventor: Masahiro Azuma, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/111,242

(22) Filed: Dec. 3, 2020

(65) Prior Publication Data
US 2021/0402837 A1    Dec. 30, 2021

(30) Foreign Application Priority Data

Jun. 25, 2020   (JP) .............................. JP2020-109767

(51) Int. Cl.
   *B60G 7/00*   (2006.01)
   *B60G 3/26*   (2006.01)
   *B60G 11/58*  (2006.01)

(52) U.S. Cl.
   CPC .............. *B60G 3/26* (2013.01); *B60G 7/008* (2013.01); *B60G 11/58* (2013.01); *B60G 2204/143* (2013.01); *B60G 2204/148* (2013.01)

(58) Field of Classification Search
   CPC .............. B60G 7/02; B60G 2204/148; B60G 2204/143; B60G 11/58; B60G 7/008; B60G 3/26; B60G 2300/07; B60G 9/003; B60G 9/00; B60G 3/207; B60G 3/205; B60G 3/20; B60G 3/185; B60G 3/18
   See application file for complete search history.

(56) References Cited

U.S. PATENT DOCUMENTS

| | | | | |
|---|---|---|---|---|
| 4,934,733 A | * | 6/1990 | Smith | ................... B60G 3/207 280/124.132 |
| 2005/0056983 A1 | * | 3/2005 | Spinella | ................... F16F 1/38 267/293 |
| 2007/0176386 A1 | * | 8/2007 | Schlangen | ............... B60G 3/20 280/124.135 |
| 2009/0072505 A1 | * | 3/2009 | McGinnis | .............. B60G 9/003 280/124.116 |
| 2009/0256321 A1 | * | 10/2009 | Suzuki | ................... B60G 7/008 280/5.521 |
| 2014/0251710 A1 | * | 9/2014 | Juan | ........................ B60G 11/16 180/218 |
| 2019/0248201 A1 | * | 8/2019 | Johnson | .................. B60G 11/27 |
| 2020/0130448 A1 | * | 4/2020 | Hisamura | .............. B62D 21/11 |
| 2021/0031580 A1 | * | 2/2021 | Booth | ...................... B60G 3/26 |

FOREIGN PATENT DOCUMENTS

| | | | | |
|---|---|---|---|---|
| CN | 106476549 A | * | 3/2017 | |
| CN | 106585302 A | * | 4/2017 | |
| DE | 19952325 A1 | * | 5/2000 | ............... B60G 7/02 |
| JP | 201251506 A | | 3/2012 | |

* cited by examiner

*Primary Examiner* — Paul N Dickson
*Assistant Examiner* — Maxwell L Meshaka
(74) *Attorney, Agent, or Firm* — The Webb Law Firm

(57) ABSTRACT

Provided is a work vehicle including a wheel support member including an axle that supports a pair of left and right travel wheels; a link mechanism that is provided spanning between a vehicle body and the wheel support member, and that supports the wheel support member such that the wheel support member can be raised and lowered; and a suspension mechanism that is provided spanning between a suspension support section formed on the vehicle body and the wheel support member, and that elastically supports the wheel support member.

8 Claims, 11 Drawing Sheets

WORK VEHICLE

CROSS-REFERENCE TO RELATED APPLICATION

This application claims priority to Japanese Patent Application No. 2020-109767 filed Jun. 25, 2020, the disclosure of which is hereby incorporated by reference in its entirety.

BACKGROUND OF THE INVENTION

1. Field of the Invention

The present invention relates to a work vehicle.

2. Description of the Related Art

A work vehicle is available that includes a wheel support member that supports a pair of left and right travel wheels, a link mechanism that is provided spanning between a vehicle body and the wheel support member, and that supports the wheel support member such that the wheel support member can be raised and lowered, a suspension mechanism that is provided spanning between a suspension support section formed on the vehicle body and the wheel support member, and that elastically supports the wheel support member, and a lateral link that is coupled to a vehicle body-side support section formed on the vehicle body and a wheel-side support section formed on the wheel support member, and that restricts lateral movement of the wheel support member.

An example of a work vehicle of this kind is the work vehicle described in JP 2012-51506A (Patent Document 1). In this work vehicle, a pair of left and right auxiliary frames and a pair of rear axle cases are provided as the wheel support member, an upper arm and a lower arm are provided as the link mechanism, a suspension unit is provided as the suspension mechanism, and a lateral rod is provided as the lateral link.

SUMMARY OF THE INVENTION

In the above-described work vehicle, the link mechanism includes an upper link having a front end portion supported by a link support section formed on the vehicle body so as to be swingable up and down about an upper pivotal support axis, and a rear end portion coupled to the wheel support member so as to be swingable about an upper coupling axis relative to the wheel support member, and a lower link having a front end portion supported by the link support section so as to be swingable up and down about a lower pivotal support axis, and a rear end portion coupled to the wheel support member so as to be swingable about a lower coupling axis relative to the wheel support member. In such a work vehicle, a moment due to the weight of the wheel support member and the wheels is generated in the link support section and so forth. Accordingly, a large load may be imposed on the link mechanism and a member that supports the link mechanism.

Therefore, there is a need for a work vehicle in which a moment due to the weight of the wheel support member and the wheels is less likely to be generated.

A work vehicle according to the present invention includes a wheel support member including an axle that supports a pair of left and right travel wheels; a link mechanism that is provided spanning between a vehicle body and the wheel support member, and that supports the wheel support member such that the wheel support member can be raised and lowered; and a suspension mechanism that is provided spanning between a suspension support section formed on the vehicle body and the wheel support member, and that elastically supports the wheel support member, wherein Expression (1) is satisfied:

$$\sin(\theta+\alpha)\cdot\cos\theta > 0 \qquad (1)$$

where $\theta$ is an angle formed by the suspension mechanism and a vertical line, and $\alpha$ is an angle formed by a straight line passing through a supporting location of the suspension mechanism for the wheel support member and the axle and a vertical line.

A moment due to the weight of the wheels and the wheel support section is generated around the axle. By satisfying Expression (1) above, a moment in a direction opposite to that of the moment due to the weight of the wheels and the wheel support section can be generated by a reaction force due to the suspension mechanism. Accordingly, the generated moment can be reduced. As a result, the load imposed on members that support the wheels such as a link mechanism can be reduced.

In the above-described configuration, it is preferable that one end of the suspension mechanism is supported by the suspension support section so as to be swingable about a first axis, and another end of the suspension mechanism is supported by the wheel support section so as to be swingable about a second axis.

With the above-described configuration, a reaction force due to the suspension mechanism can be suitably generated.

In the above-described configuration, it is preferable that the suspension mechanism includes a suspension spring, and a damper that is passed through the suspension spring, and one end of the damper is supported by the suspension support section so as to be swingable about a lateral axis, and another end of the damper is supported by the wheel support section so as to be swingable about a lateral axis.

With the above-described configuration, the suspension spring can suitably generate a reaction force.

In the above-described configuration, it is preferable that Expression (4) below is satisfied:

$$\alpha = \tan^{-1}\{(Ws2 \cdot \tan\theta 2 - Ws1 \cdot \tan\theta 1)/(Ws1 - Ws2)\} \qquad (4)$$

where Ws1 is a reaction force of the suspension spring under a first loading condition, $\theta 1$ is a value of $\theta$ under the first loading condition, Ws2 is a reaction force of the suspension spring under a second loading condition in which a load weight is larger than the first loading condition, and $\theta 2$ is a value of $\theta$ under the second loading condition.

By satisfying the above-described configuration, the generated moment can be suitably reduced, in particular, between the first loading condition and the second loading condition.

In the above-described configuration, it is preferable that Expression (5) below is satisfied:

$$L = lw \cdot Wu/Ws1 \times (Ws1 - Ws2)/\{Ws2 \cdot \tan\theta 2 - Ws1 \cdot \tan\theta 1 + (Ws1 - Ws2) \cdot \sin\alpha\} \qquad (5)$$

where L is a distance between the first axis and an axis of the axle, and lw is a horizontal distance between the axis of the axle and a center of gravity of a spring lower portion that is a portion suspended from the suspension mechanism.

With the above-described configuration, the moment generated under the first loading condition and the second loading condition can be 0. In addition, the moment generated between the first loading condition and the second loading condition can be suitably reduced.

DETAILED DESCRIPTION OF PREFERRED EMBODIMENTS

Hereinafter, an exemplary embodiment of the present invention will be described with reference to the drawings.

Figure 1:
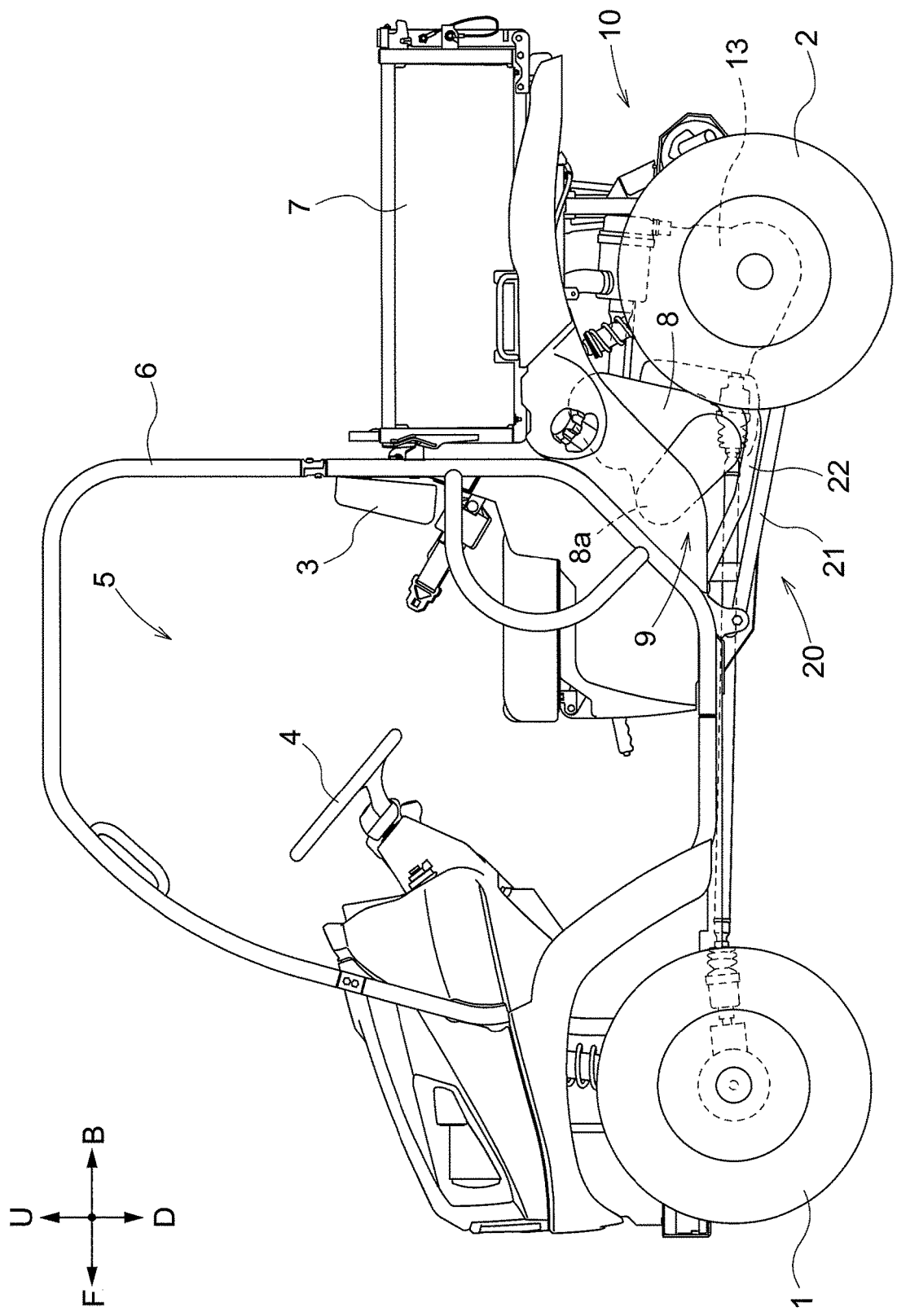
FIG. 1 is a left side view showing the entirety of a multi-purpose work vehicle.

Note that in the following description, regarding the traveling vehicle body of a multi-purpose work vehicle, the direction indicated by the arrow F shown in FIG. 1 is the "vehicle body forward direction", the direction indicated by the arrow B is the "vehicle body rearward direction", the direction indicated by the arrow U is the "vehicle body upward direction", the direction indicated by the arrow D is the "vehicle body downward direction", the direction toward the front side of the paper is the "vehicle body leftward direction", and the direction toward the back side of the paper is the "vehicle body rightward direction".

Overall Configuration of Multi-Purpose Work Vehicle

As shown in FIG. 1, the multi-purpose work vehicle includes a traveling vehicle body in which a pair of left and right front wheels 1 are provided so as to be capable of being steered and driven, and a pair of left and right rear wheels 2 are provided so as to be capable of being driven. A driving section 5 including a driver's seat 3 and a steering wheel 4 for steering the front wheels 1 is formed at a front portion of the traveling vehicle body. The driving section 5 includes a ROPS 6 that covers the boarding space. A loading platform 7 is provided at a rear portion of the traveling vehicle body. A prime mover section 9 including an engine 8 is formed below the loading platform 7.

Regarding Configuration of Suspension System of Rear Wheels

Figure 2:
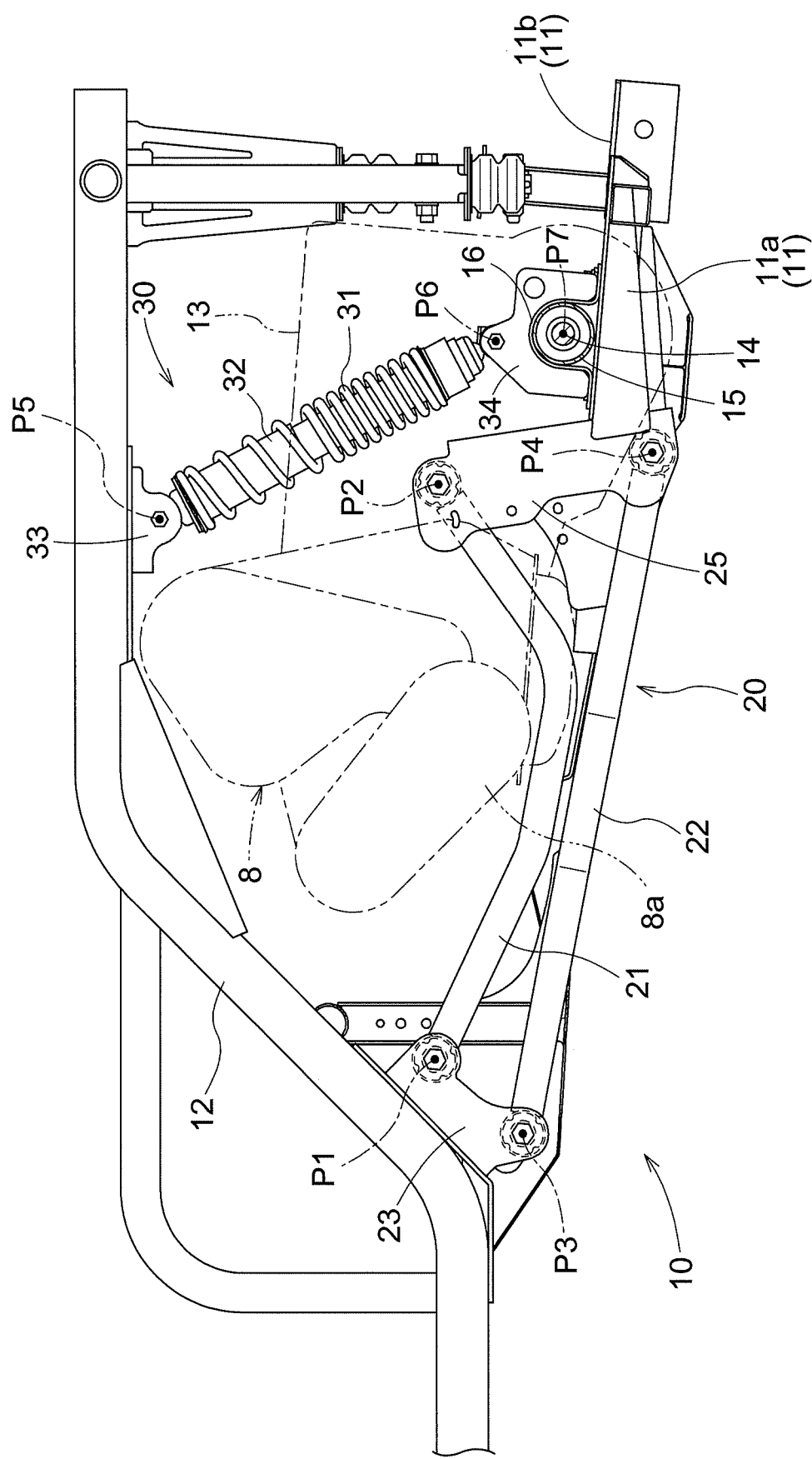
FIG. 2 is a left side view showing a suspension system of rear wheels.
Figure 3:
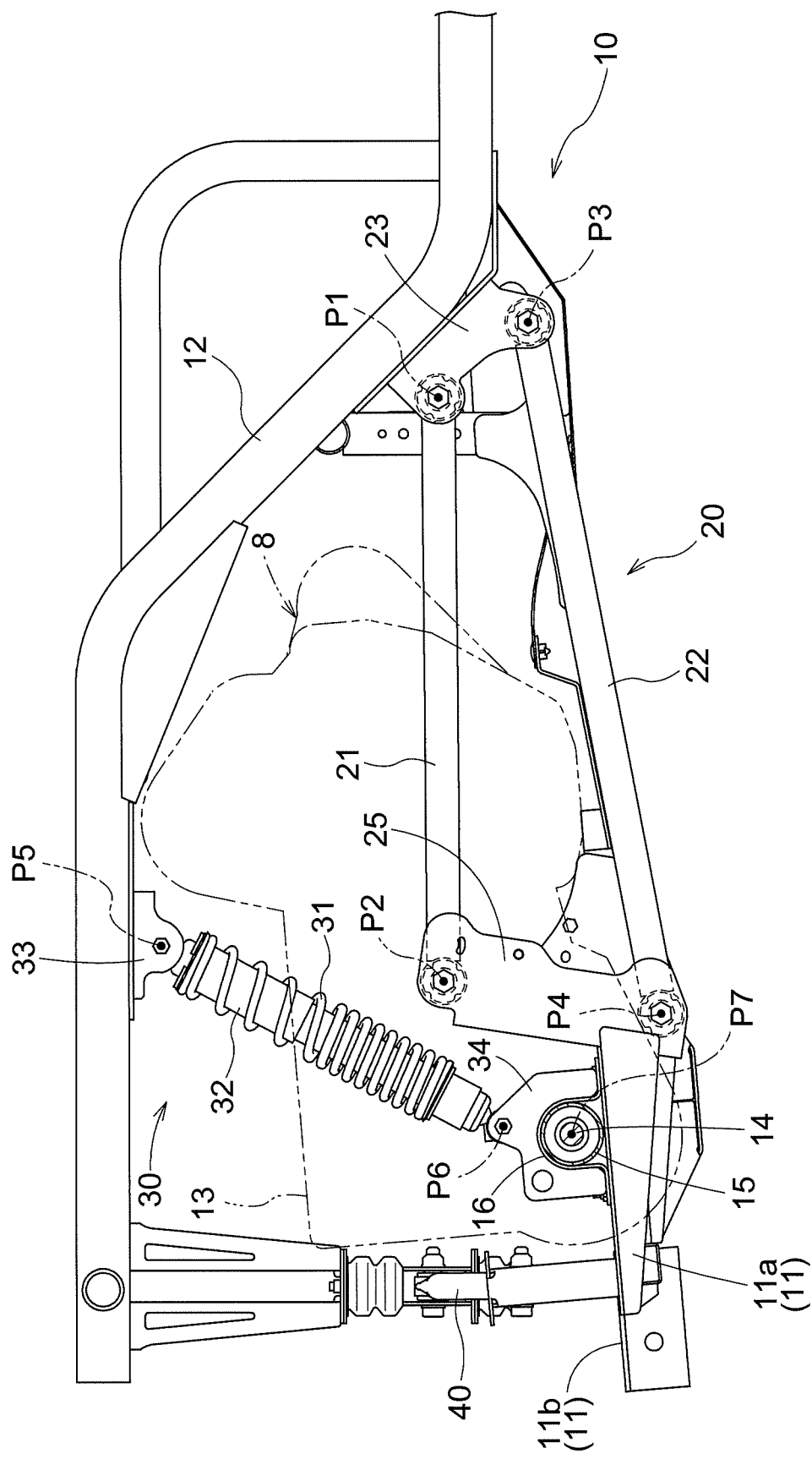
FIG. 3 is a right side view showing the suspension system of the rear wheels.
Figure 4:
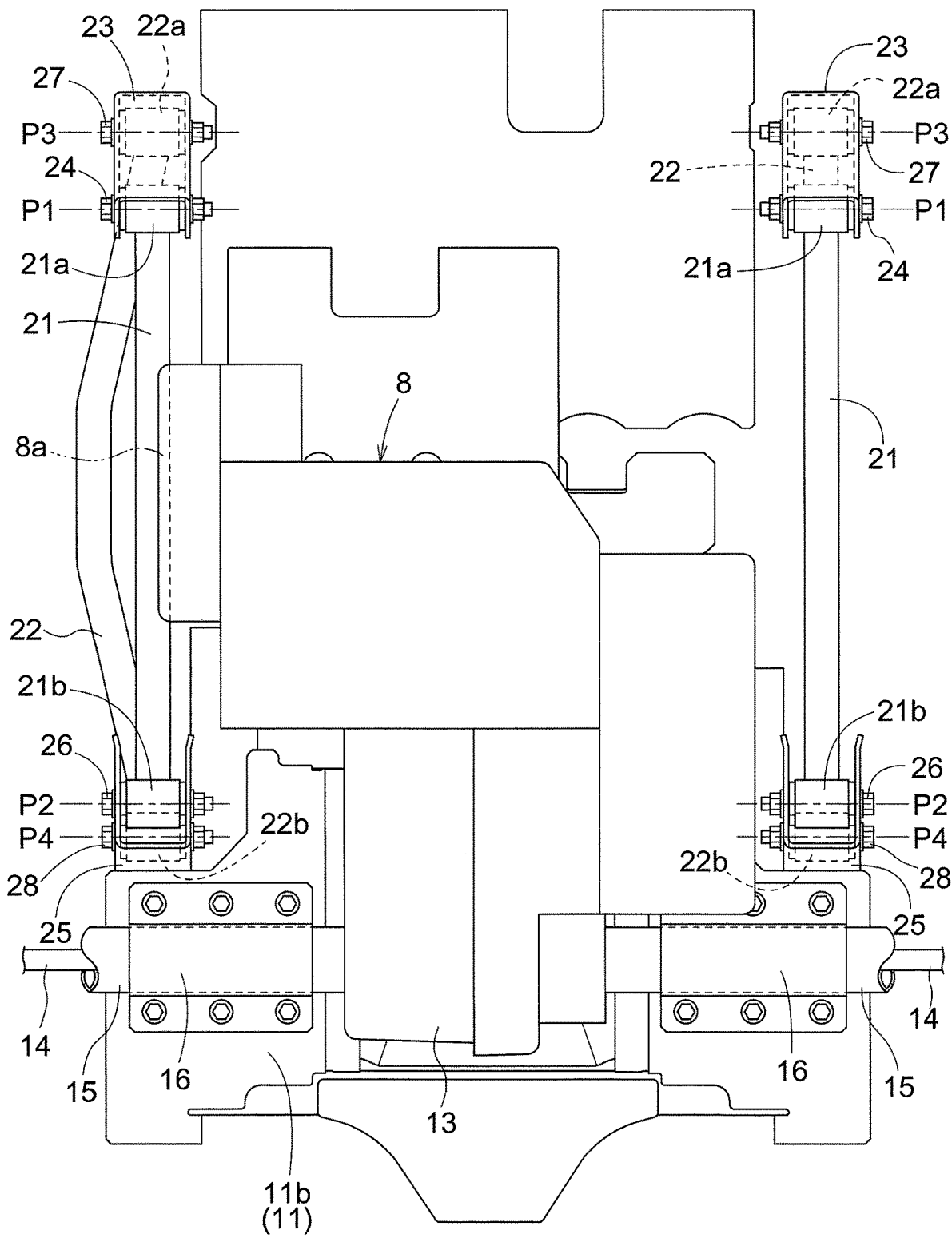
FIG. 4 is a plan view showing the suspension system of the rear wheels.
Figure 5:
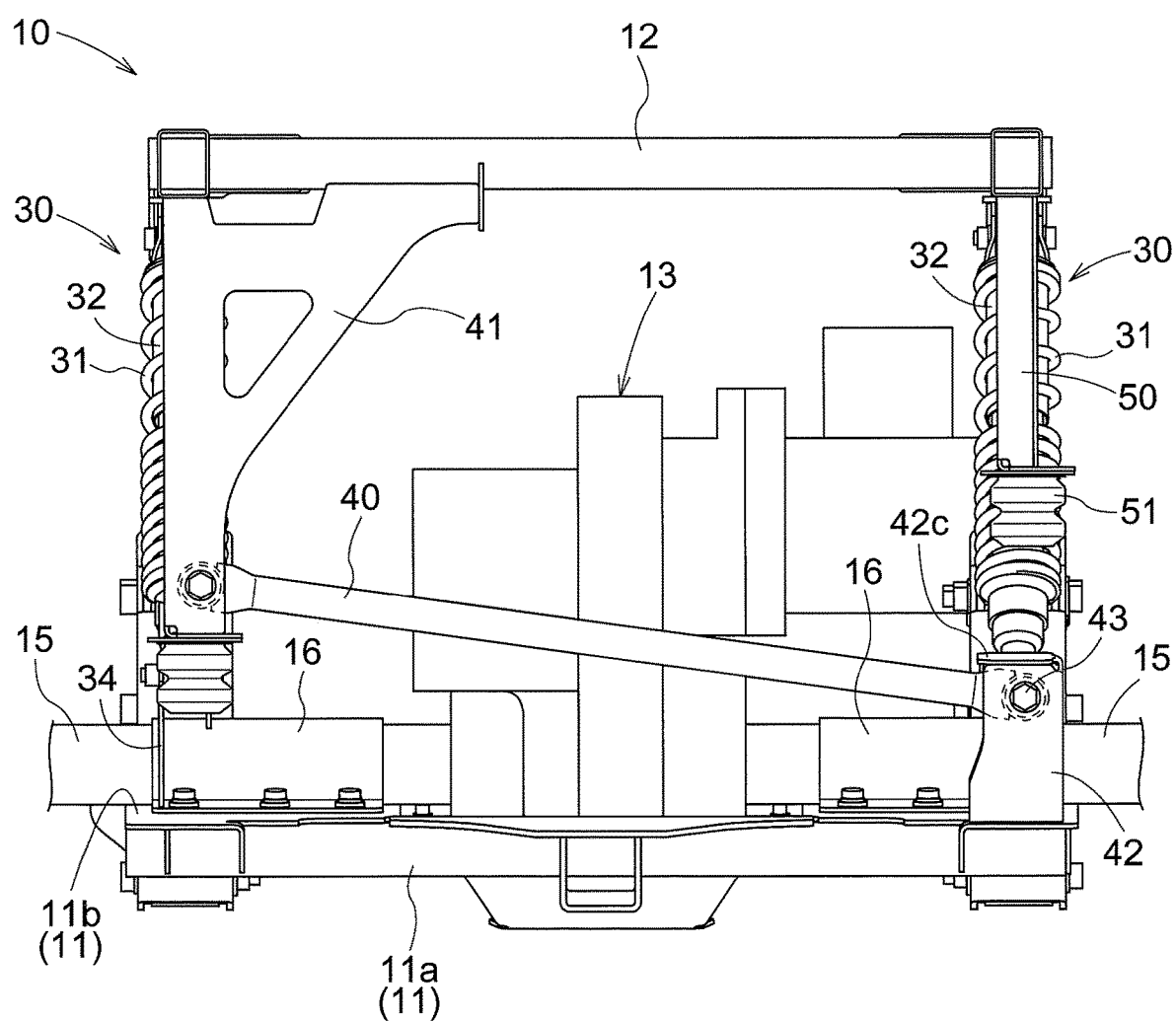
FIG. 5 is a rear view showing the suspension system of the rear wheels.

FIG. 2 is a left side view showing a suspension system 10 of the rear wheels 2. FIG. 3 is a right side view showing the suspension system 10 of the rear wheels 2. FIG. 4 is a plan view showing the suspension system 10 of the rear wheels 2. FIG. 5 is a rear view showing the suspension system 10 of the rear wheels 2.

As shown in FIGS. 2 to 5, the suspension system 10 of the rear wheels 2 includes a wheel support member 11 that supports the pair of left and right rear wheels 2, a pair of left and right link mechanisms 20 for enabling the left and right rear wheels 2 to be raised and lowered relative to a vehicle body frame 12 by causing the wheel support member 11 to be supported by the vehicle body frame 12 so as to be able to be raised and lowered, a suspension mechanism 30 for enabling the left and right rear wheels 2 to be elastically supported by elastically supporting the wheel support member 11, and a lateral link 40 that restricts lateral movement of the wheel support member 11.

Figure 6:
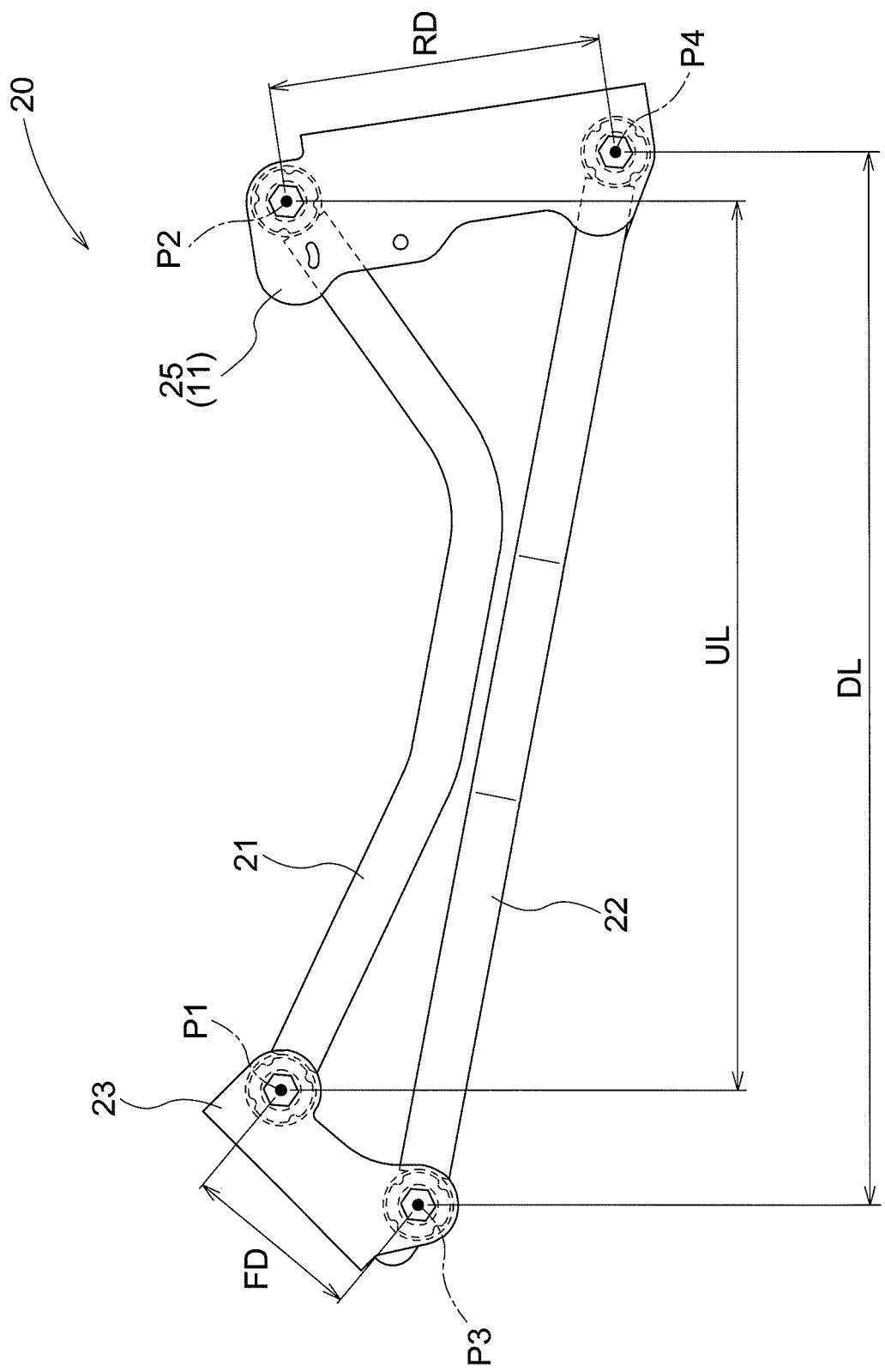
FIG. 6 is a left side view showing a left link mechanism.

As shown in FIGS. 2, 4, and 6, the wheel support member 11 includes a support frame section 11a, and a platform section 11b provided above the support frame section 11a. A transmission 13, into which the power of the engine 8 is input, is supported at a laterally central portion of the wheel support member 11. The engine 8 is coupled to the transmission 13, and is supported by the wheel support member 11 via the transmission 13.

As shown in FIGS. 2, 3, and 4, a left rear axle 14 extends from the transmission 13 in the left lateral direction. A right rear axle 14 extends from the transmission 13 in the right lateral direction. A left rear axle case 15 that rotatably supports the left rear axle 14 and a right rear axle case 15 that rotatably supports the right rear axle 14 are placed on a left portion and a right portion, respectively, of the platform section 11b. The left and right rear axle cases 15 are each fixed to the platform section 11b by a case holder 16 fixed to the platform section 11b with coupling bolts so as to be wrapped around an outer circumferential portion of the rear axle case 15. The left and right rear wheels 2 are supported by the wheel support member 11 via the rear axles 14 and the transmission 13. That is, the left and right rear wheels 2 are supported by the wheel support member 11 in a state in which relative positional displacement does not occur between the left and right rear wheels 2. Although the engine 8 and the transmission 13 are supported by the wheel support member 11 together with the rear wheels 2 in the present embodiment, the present invention is not limited thereto. For example, it is possible to adopt a configuration in which the transmission 13 is supported by the wheel support member 11 together with the left and right rear wheels 2, and the engine 8 is not supported by the wheel support member 11. Alternatively, it is possible to adopt a configuration in which only the left and right rear wheels 2 are supported by the wheel support member 11, and the engine 8 and the transmission 13 are not supported by the wheel support member 11.

As shown in FIGS. 2, 3, and 4, the left and right link mechanisms 20 each include an upper link 21 extending in the front-rear direction of the vehicle body, and a lower link 22 extending in the front-rear direction of the vehicle body.

A front end portion of each upper link 21 is supported so as to be swingable about an upper pivotal support axis P1 extending in the lateral width direction of the vehicle body by a vehicle-side link support section 23 formed on the vehicle body frame 12. Specifically, an upper front boss section 21a formed at the front end portion of the upper link 21 and the link support section 23 are coupled via an upper fulcrum shaft 24 internally fitted to the upper front boss section 21a. The upper fulcrum shaft 24 has the upper pivotal support axis P1. A rear end portion of the upper link 21 is supported so as to be swingable about an upper coupling axis P2 extending in the lateral width direction of the vehicle body by a wheel-side link coupling section 25 formed at a lateral end portion of the wheel support member 11. Specifically, an upper rear boss section 21b formed at the rear end portion of the upper link 21 and the link coupling section 25 are coupled via an upper coupling shaft 26 internally fitted to the upper rear boss section 21b. The upper coupling shaft 26 has the upper coupling axis P2.

A front end portion of each lower link 22 is supported so as to be swingable about a lower pivotal support axis P3 extending in the lateral width direction of the vehicle body by a portion of the link support section 23 that is located below the portion to which the upper link 21 is coupled. Specifically, a lower front boss section 22a formed at the front end portion of the lower link 22 and the link support section 23 are coupled via a lower fulcrum shaft 27 internally fitted to the lower front boss section 22a. The lower fulcrum shaft 27 has the lower pivotal support axis P3. A rear end portion of the lower link 22 is supported so as to be swingable about a lower coupling axis P4 extending in the lateral width direction of the vehicle body by a portion of the link coupling section 25 that is located below the portion to which the upper link 21 is coupled. Specifically, a lower rear boss section 22b formed at the rear end portion of the lower link 22 and the link coupling section 25 are coupled via a lower coupling shaft 28 internally fitted to the lower rear boss section 22b. The lower coupling shaft 28 has the lower coupling axis P4.

Figure 8:
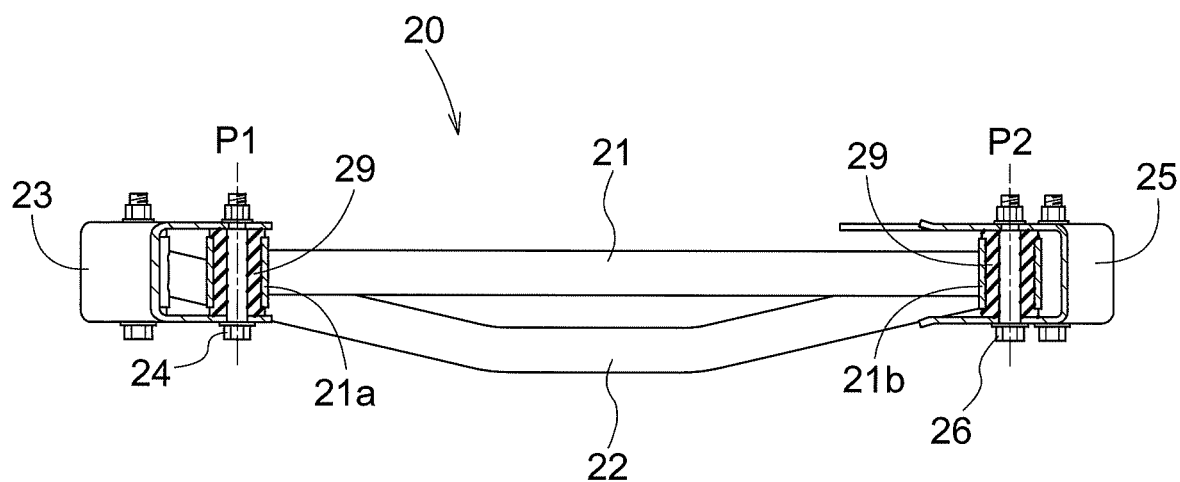
FIG. 8 is a cross-sectional view showing a support structure of a left upper link.
Figure 9:
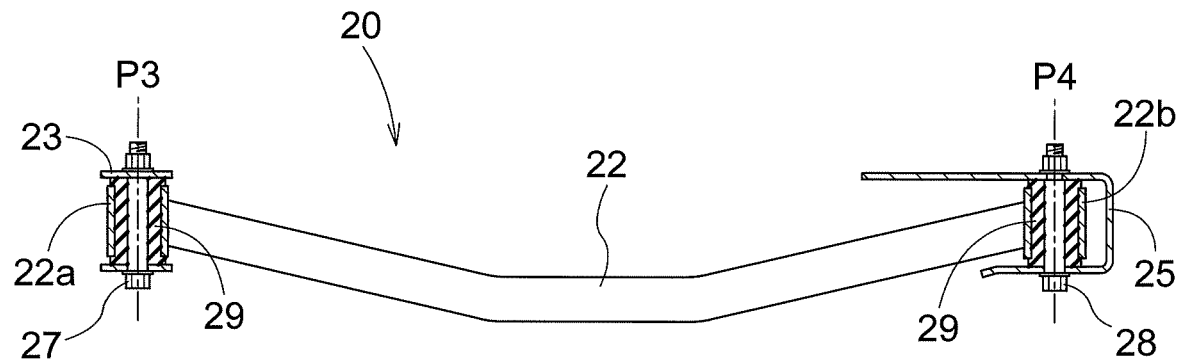
FIG. 9 is a cross-sectional view showing a support structure of a left lower link.

As shown in FIGS. 8 and 9, in the left link mechanism 20, an elastic member 29 is interposed between the upper link 21 and the link support section 23, between the lower link 22 and the link support section 23, between the upper link 21 and the link coupling section 25, and between the lower link 22 and the link coupling section 25. When a twist is to be generated between the upper link 21 and the link support section 23, between the lower link 22 and the link support section 23, between the upper link 21 and the link coupling section 25, or between the lower link 22 and the link coupling section 25, the corresponding elastic member 29 is elastically deformed, and the twist is cancelled by this elastic deformation. In the right link mechanism 20, elastic members 29 are interposed in the same manner as in the case of the left link mechanism 20. In the present embodiment, the elastic members 29 are formed in either a tubular shape for being internally fitted to the upper front boss section 21a and externally fitted to the upper fulcrum shaft 24, a tubular shape for being internally fitted to the lower front boss section 22a and externally fitted to the lower fulcrum shaft 27, a tubular shape for being internally fitted to the upper rear boss section 21b and externally fitted to the upper coupling shaft 26, or a tubular shape for being internally fitted to the lower rear boss section 22b and externally fitted to the lower coupling shaft 28. However, the present invention is not limited thereto. For example, an elastic member may be interposed between the upper fulcrum shaft 24 and the link support section 23, between the lower fulcrum shaft 27 and the link support section 23, between the upper coupling shaft 26 and the link coupling section 25, and between the lower coupling shaft 28 and the link coupling section 25.

Figure 7:
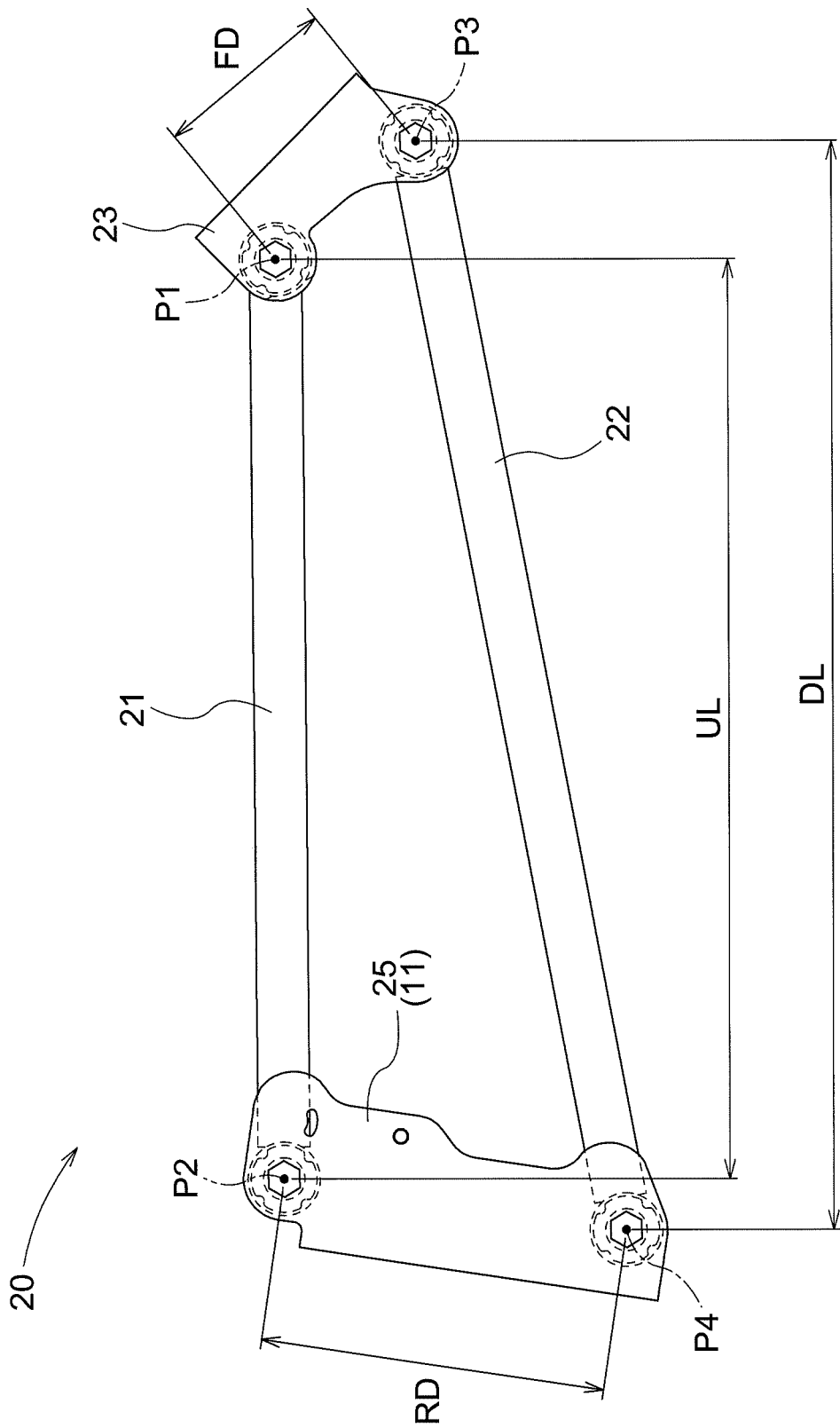
FIG. 7 is a right side view showing a right link mechanism.

As shown in FIGS. 6 and 7, for the left and right link mechanisms 20, the distance between the upper pivotal support axis P1 and the upper coupling axis P2 is represented as UL, the distance between the lower pivotal support axis P3 and the lower coupling axis P4 is represented as DL, the size of the interval between the upper pivotal support axis P1 and the lower pivotal support axis P3 is represented as FD, and the size of the interval between the upper coupling axis P2 and the lower coupling axis P4 is represented as RD.

The distance UL is set to be shorter than the distance DL. The size of the interval RD is set to be larger than the size of the interval FD. In an empty state of the vehicle body, or in other words, a state in which there is no occupant in the driving section 5, and there is no load on the loading platform 7, each of the link mechanisms 20 is configured such that the lower coupling axis P4 is located below the lower pivotal support axis P3 as shown in FIGS. 2 and 3.

Even if a twist is to be generated between the upper link 21 and the link support section 23, between the lower link 22 and the link support section 23, between the upper link 21 and the link coupling section 25, and between the lower link 22 and the link coupling section 25 when the rear wheel 2, which is one of the left and right rear wheels 2, is lowered below its position in the empty state, and the other rear wheel 2 is raised above its position in the empty state, the twists are cancelled by the elastic deformation of the elastic members 29, and thus the left and right upper links 21 and the left and right lower links 22 are smoothly raised or lowered. In this case, between the left and right rear wheels 2, a positional displacement occurs in which the lowered rear wheel 2 is displaced to a position forward of its position before being lowered, and the raised rear wheel 2 is displaced to a position rearward of its position before being raised, whereby the wheel support member 11 is tilted leftward or rightward, and forward or rearward, as a result of which the lowered rear wheel 2 is located forward of the raised rear wheel 2. However, the positional displacement in the front-rear direction between the lowered rear wheel 2 and the raised rear wheel 2 is minimized because the distance UL is shorter than the distance DL, the size of the interval RD is larger than the size of the interval FD, and the lower coupling axis P4 in the empty state is located below the lower pivotal support axis P3.

As shown in FIGS. 3, 4, and 7, the upper link 21 and the lower link 22 of the right link mechanism 20 are each formed in a straight shape. As shown in FIGS. 2, 4, and 6, the upper link 21 of the left link mechanism 20 is formed in a curved shape having an intermediate portion located below a front portion and a rear portion so as to avoid coming into contact, from below, with an alternator cover 8a provided at a lateral side portion of the engine 8. The lower link 22 of the left link mechanism 20 is formed in a curved shape having an intermediate portion bulging laterally outward so as to be raised or lowered while avoiding coming into contact with the intermediate portion of the upper link 21 from the laterally outer side.

As shown in FIGS. 2, 3, and 5 the suspension mechanism 30 includes a pair of left and right suspension springs 31, and a pair of left and right dampers 32.

As shown in FIGS. 2 and 3, the left and right dampers 32 are each coupled to a vehicle body-side suspension support section 33 formed on the vehicle body frame 12, and a wheel-side suspension support section 34 provided on the wheel support member 11 by being formed on the case holder 16, and expand and contract as the wheel support member 11 is raised and lowered. The left and right suspension springs 31 are externally fitted to the left and right dampers 32, respectively. An upper end portion of each suspension spring 31 is received and supported by a spring locking section formed at an upper portion of the corresponding damper 32, and is supported so as to be swingable about a first axis P5 by the vehicle body-side suspension support section 33 via the upper portion of the damper 32. A lower end portion of each suspension spring 31 is received and supported by a spring locking section formed at a lower portion of the corresponding damper 32, and is supported so as to be swingable about a second axis P6 by the wheel support member 11 via the lower portion of the damper 32.

The left and right suspension springs 31 expand and contract as the respective corresponding dampers 32 expand and contract.

As shown in FIG. 5, the lateral link 40 is coupled to a vehicle body-side support section 41 extending downward from a rear end portion of the vehicle body frame 12, and a wheel-side support section 42 protruding upward from the lateral end portion of the wheel support member 11.

Figure 10:
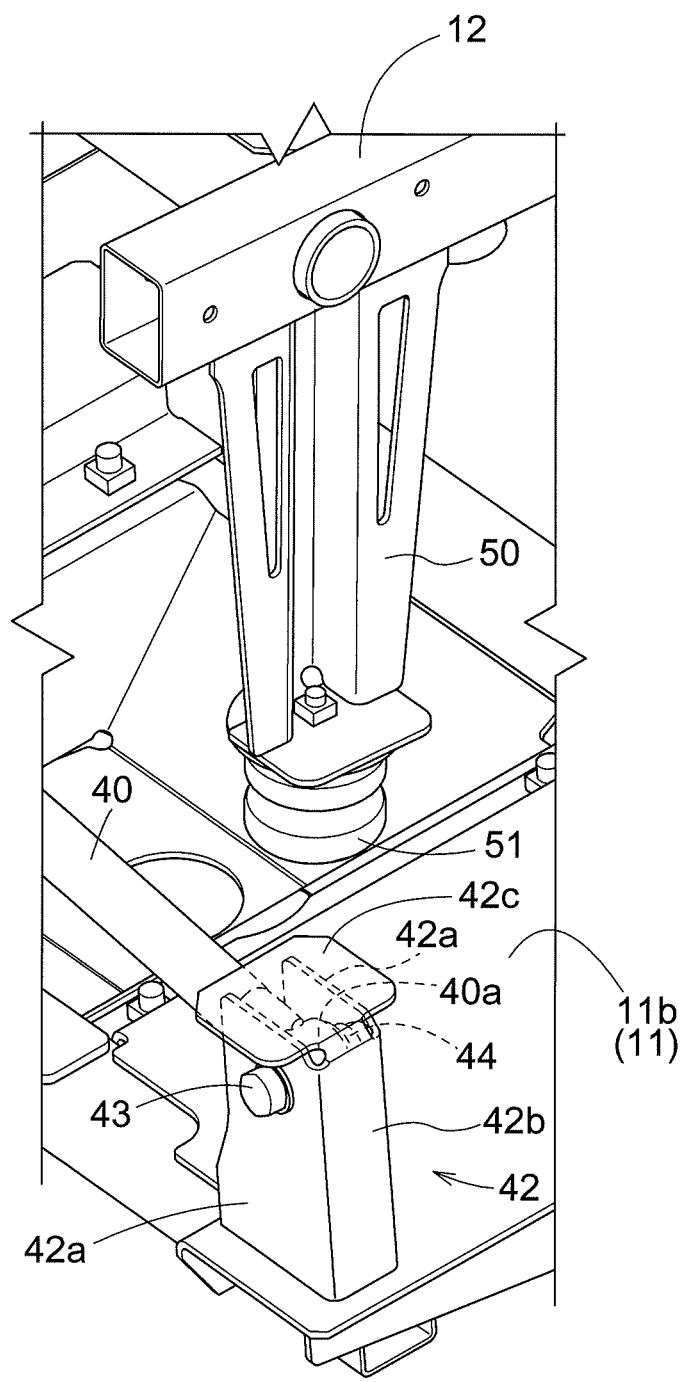
FIG. 10 is a perspective view showing a wheel-side support section and a stopper member.
Figure 11:
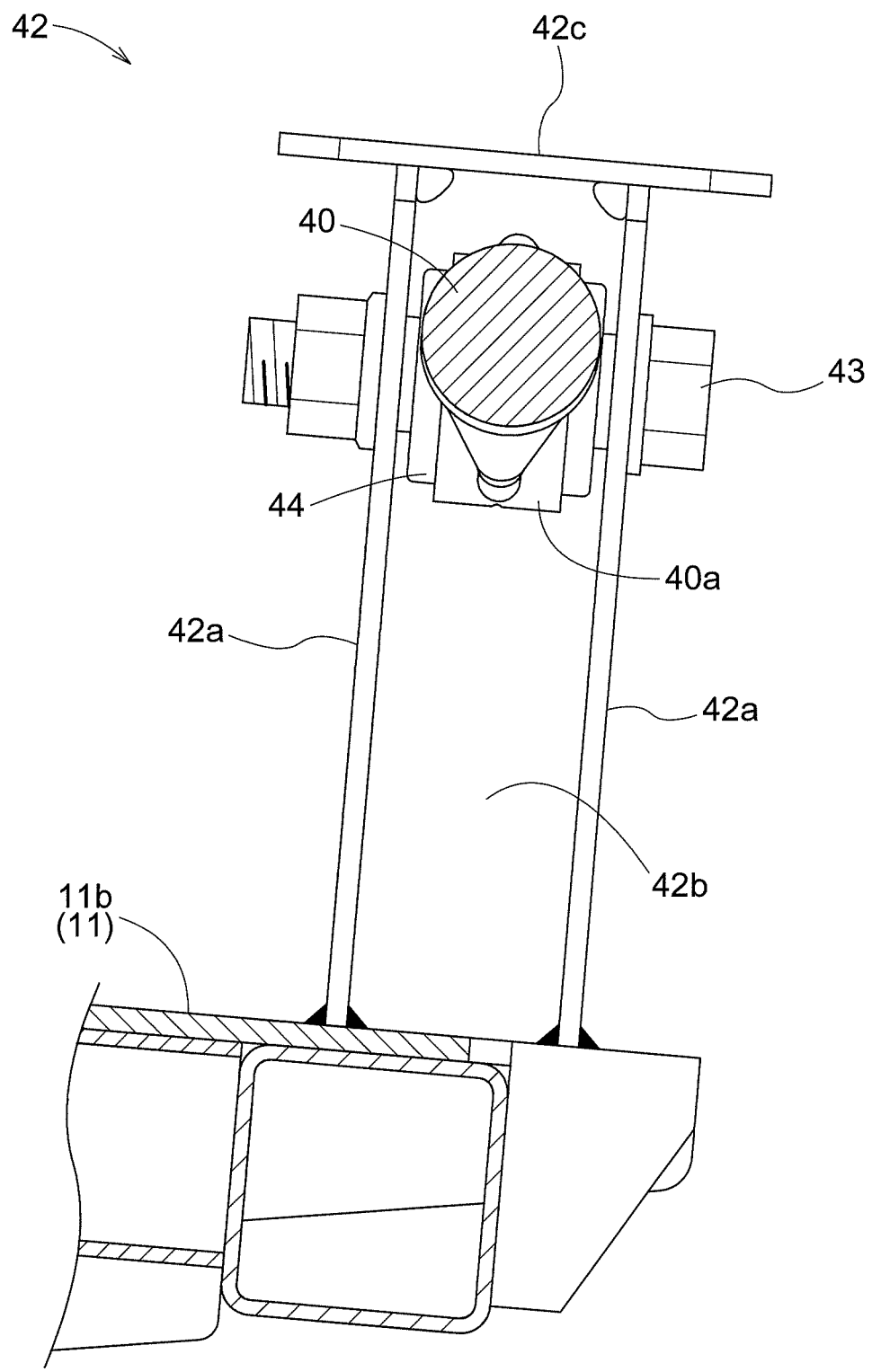
FIG. 11 is a side view showing the wheel-side support section.

As shown in FIGS. 10 and 11, the wheel-side support section 42 includes a pair of longitudinal plate sections 42a disposed on the front and rear sides, respectively, relative to an end portion 40a of the lateral link 40, a coupling plate section 42b that couples lateral end portions of the pair of longitudinal plate sections 42a, and an upper plate section 42c configured to be abutted against upper ends of the pair of longitudinal plate sections 42a from above, and to receive a cushion material 51 of a stopper member 50. The pair of longitudinal plate sections 42a are fixed to the wheel support member 11 by being welded to the platform section 11b. The upper plate section 42c is extended from an upper end portion of the coupling plate section 42b, and is supported by the coupling plate section 42b. Specifically, the upper plate section 42c is formed by a bent end portion provided at an upper portion of the coupling plate section 42b. The upper plate section 42c and the pair of longitudinal plate sections 42a are not welded together. The upper plate section 42c is not attached to the pair of longitudinal plate sections 42a. The pair of longitudinal plate sections 42a and the coupling plate section 42b are coupled by being molded in one piece. A screw shaft member 43 for causing the end portion 40a to be pivotally supported by the pair of longitudinal plate sections 42a is passed through the end portion 40a and the pair of longitudinal plate sections 42a. The pair of longitudinal plate sections 42a are fastened toward the end portion 40a by the screw shaft member 43 so as to be along the end portion 40a.

In the wheel-side support section 42, the end portion 40a is pivotally supported by the pair of longitudinal plate sections 42a using the screw shaft member 43, and the pair of longitudinal plate sections 42a are along the end portion 40a, whereby the lateral link 40 is supported such that the lateral link 40 swings up and down relative to the wheel-side support section 42 without being rattled.

An elastic member 44 is interposed between the lateral link 40 and the vehicle body-side support section 41. When a twist is to be generated between the lateral link 40 and the vehicle body-side support section 41, the elastic member 44 is elastically deformed, and the twist is cancelled by this elastic deformation. An elastic member is interposed between the lateral link 40 and the wheel-side support section 42, similarly to that between the lateral link 40 and the vehicle body-side support section 41.

As shown in FIG. 10, a stopper member 50 extends from the vehicle body frame 12 toward the wheel-side support section 42. A cushion material 51 is provided at a lower end portion of the stopper member 50. When the wheel support member 11 is raised, the cushion material 51 abuts against an upper end portion of the wheel-side support section 42, and the rising limit of the wheel support member 11 is set by the cushion material 51. The wheel-side support section 42 serves as a limit setting member that sets the rising limit of the rear wheel 2 relative to the vehicle body.

Arrangement of Suspension Mechanism

Figure 12:
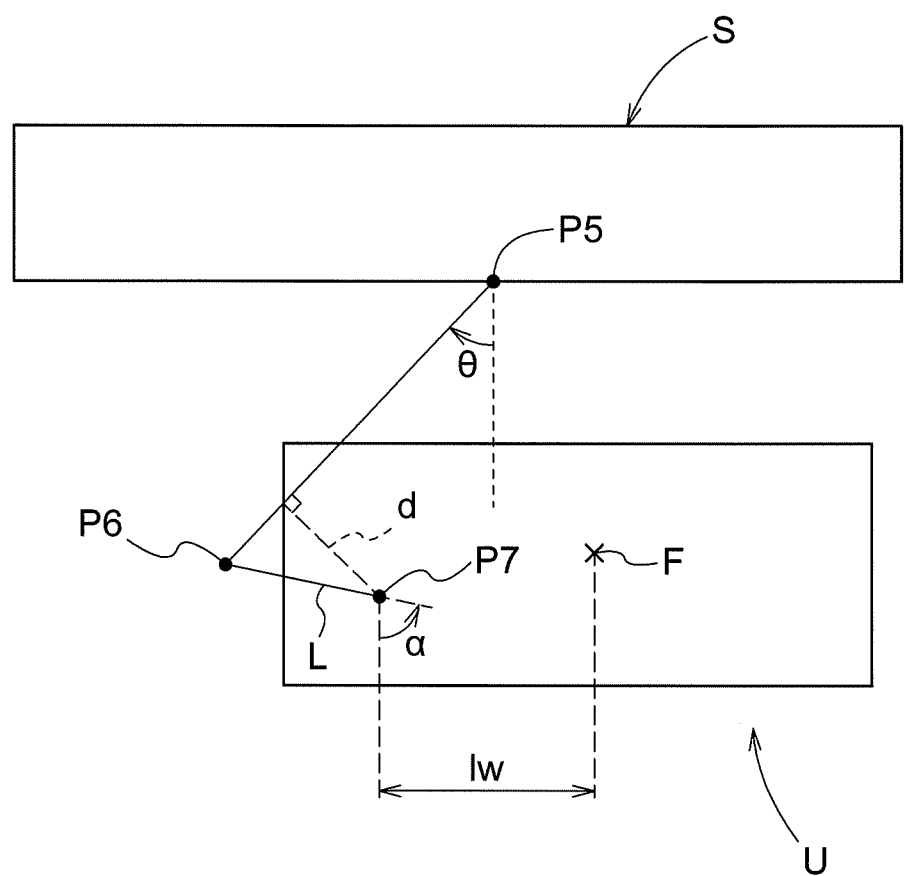
FIG. 12 is a schematic diagram showing a right side surface of the suspension system of the rear wheels.

FIG. 12 is a schematic diagram showing the vicinity of the suspension system 10 of the rear wheels 2. Here, a spring upper portion S, a spring lower portion U, and the suspension mechanism 30 (suspension spring 32) are schematically shown. Here, the spring upper portion S is a portion that is supported by the suspension mechanism 30 from below, and is formed by the vehicle body frame 12 and so forth. The spring lower portion U is a portion that is suspended from the suspension mechanism 30, and includes the rear wheels 2, the rear wheel support member 11, and so forth.

In this work vehicle, as shown in FIGS. 3 and 12, the suspension spring 31 (damper 32) is supported so as to satisfy a relationship represented by Expression (1) below:

$$\sin(\theta+\alpha)\cdot\cos\theta > 0 \qquad (1)$$

where θ is an angle formed by a straight line passing through the first axis P5 and the second axis P6 and a vertical line (i.e., an angle formed by the suspension mechanism 30 and a vertical line). α is an angle formed by a straight line passing through the second axis P6 and the axis P7 of the rear axle and a vertical line (i.e., an angle formed by a straight line passing through a supporting location of the suspension mechanism for the wheel support member and the axle and a vertical line).

That is, in FIG. 12, a moment Mu generated around the axis P7 of the rear axle by the weight of the spring lower portion S can be represented by Expression (2) below:

$$Mu = Wu \cdot lw \qquad (2)$$

where Wu is the weight of the spring lower portion S, lw is the horizontal distance between the axis P7 of the rear axle and the center of gravity F of the spring lower portion S.

A moment Ms generated around the axis P7 of the rear axle by the reaction force due to the suspension spring 31 (suspension mechanism 30) can be represented by Expression (3) below:

$$Ms = Ws \cdot L = Ws \cdot d/\cos\theta \qquad (3)$$

where Ws is the reaction force due to the suspension spring 31, and L is the distance between the axis P6 and the axis P7 of the rear axle.

By the suspension spring 31 (suspension mechanism 30) being disposed so as to satisfy Expression (1), the moment generated by the weight of the spring lower portion U is reduced by the moment due to the reaction force generated by the suspension spring 32. That is, by the suspension spring 31 (damper 32) being disposed so as to satisfy a relationship represented by Expression (1) above, a moment in a direction opposite to that of the moment (Expression (2)) generated by the weight of the spring lower portion U is generated by the suspension spring 32 (Expression (3)). Accordingly, the moment generated by the weight of the spring lower portion can be reduced.

Note that the orientation of a vehicle varies with the load weight on the vehicle, including the weight of occupants. Therefore, θ varies with the load weight. Here, Expression (1) may be satisfied for the value of θ at any load weight from 0 (empty load state) to a preset maximum load weight.

As described above, θ varies with the load weight on the vehicle. The reaction force W due to the suspension spring 31 (suspension mechanism 30) is dependent on the weight of the spring upper portion S, and the weight of the spring upper portion S varies with the load weight on the vehicle, including occupants.

Here, for example, the reaction force Ws due to the suspension spring 32 under a first loading condition (e.g., an empty load state (the load weight is 0) is represented as Ws1, and θ at this time is represented as θ1. The reaction force Ws due to the suspension spring 32 under a second loading condition (e.g., a state in which the load weight is a preset maximum load weight) is represented as Ws2, and θ at this time is represented as θ2. In this case, a and L may preferably satisfy Expressions (4) and (5) below:

$$\alpha = \tan^{-1}\{(Ws2 \cdot \tan\theta2 - Ws1 \cdot \tan\theta1)/(Ws1 - Ws2)\} \quad (4)$$

$$L = lw \cdot Wu/Ws1 \times (Ws1 - Ws2)/\{Ws2 \cdot \tan\theta2 - Ws1 \cdot \tan\theta1 + (Ws1 - Ws2) \cdot \sin\alpha\} \quad (5)$$

By satisfying Expressions (4) and (5) above, the moment Mu and the moment Ms are balanced in the empty load state and the maximum load weight state, and the moment around the axis P7 of the rear axle is 0.

That is, when Expression (6) below is satisfied by Expressions (2) and (3), the moment Mu and the moment Ms are balanced, and the moment around the axis P7 of the rear axle is 0.

$$Wu \cdot lw - Ws \cdot d/\cos\theta = 0 \quad (6)$$

By substituting the condition (Ws, θ)=(Ws1, θ1) of the empty load state (the first loading condition) and the condition (Ws, θ)=(Ws2, θ2) of the maximum load weight state (the second loading condition) into Expression (6) above, Expressions (4) and (5) can be derived.

As described above, the moment around the axis P7 of the rear axle can be 0 in the empty load state and the maximum load weight state. In addition, the moment around the axis P7 of the axle can be suitably reduced in a load weight range between the empty load and the maximum load weight.

Here, the first loading condition is not limited to empty load as long as the load weight is smaller than the second loading condition. Also, the second loading condition is not limited to the maximum load weight as long as the load weight is larger than the first loading condition. For example, the first loading condition may be the lowest limit of a load weight range that is frequently used, and the second loading condition may be the upper limit of the frequently used load weight range. It is also possible to adopt other forms of loading conditions.

Alternative Embodiments (1) Although the above-described embodiment shows the suspension system 10 used for supporting the rear wheels 2, the suspension system may be used for front wheels.

(2) Although the above-described embodiment shows an example in which the engine 8 and the transmission 13 are supported by the wheel support member 11, the present invention is not limited thereto. For example, it is possible to adopt a configuration in which the transmission 13 is supported, but the engine 8 is not supported, or a configuration in which both the engine 8 and the transmission 13 are not supported.

(3) Although the above-described embodiment shows an example in which the left upper link 21 and the left lower link 22 are formed in a curved shape, they may be formed in a straight shape if there is no need to avoid a contact to the system parts.

(4) Although the above-described embodiment shows an example in which left and right link mechanisms 20 are provided, the present invention is not limited thereto. For example, it is possible to adopt a configuration in which wheels are supported by only one link mechanism including a pair of left and right lower links and one upper link provided above the lower links.

The present invention is not limited to a multi-purpose work vehicle, and is applicable to various work vehicles such as a rice planter and a tractor. Furthermore, the present invention is applicable not only to engine driven work vehicles, but also to work vehicles other than engine driven work vehicles, such as electric work vehicles driven by a motor.

What is claimed is:

1. A work vehicle comprising:
   a wheel support member including an axle that supports a pair of left and right travel wheels
   a link mechanism that is provided spanning between a vehicle body and the wheel support member, and that supports the wheel support member such that the wheel support member can be raised and lowered; and
   a suspension mechanism that is provided spanning between a suspension support section formed on the vehicle body and the wheel support member, and that elastically supports the wheel support member,
   wherein a lower end of the suspension mechanism is arranged substantially directly above the axle, and
   Expression (1) is satisfied:

$$\sin(\theta + \alpha) \cdot \cos\theta > 0 \quad (1)$$

wherein θ is an angle formed by the suspension mechanism and a vertical line, and a is an angle formed by a straight line passing through a supporting location of the suspension mechanism for the wheel support member and the axle and a vertical line.

2. The work vehicle according to claim 1, wherein one end of the suspension mechanism is supported by the suspension support section so as to be swingable about a first axis, and another end of the suspension mechanism is supported by the wheel support section so as to be swingable about a second axis.

3. The work vehicle according to claim 1, wherein the suspension mechanism includes a suspension spring, and a damper that is passed through the suspension spring, and
   wherein one end of the damper is supported by the suspension support section so as to be swingable about a first lateral axis, and another end of the damper is supported by the wheel support section so as to be swingable about a second lateral axis.

4. The work vehicle according to claim 3, wherein Expression (4) below is satisfied:

$$\alpha = \tan^{-1}\{(Ws2 \cdot \tan\theta2 - Ws1 \cdot \tan\theta1)/(Ws1 - Ws2)\} \quad (4)$$

wherein Ws1 is a reaction force of the suspension spring under a first loading condition, θ1 is a value of θ under the first loading condition, Ws2 is a reaction force of the suspension spring under a second loading condition in which a load weight is larger than the first loading condition, and θ2 is a value of θ under the second loading condition.

5. The work vehicle according to claim 4, wherein Expression (5) below is satisfied:

$$L = lw \cdot Wu/Ws1 \times (Ws1 - Ws2)/\{Ws2 \cdot \tan\theta2 - Ws1 \cdot \tan\theta1 + (Ws1 - Ws2) \cdot \sin\alpha\} \quad (5)$$

wherein L is a distance between the first axis and the axis of the axle, lw is a horizontal distance between the axis of the axle and a center of gravity of a spring lower portion that is a portion suspended from the suspension mechanism, and Wu is the weight of the spring lower portion.

6. The work vehicle according to claim 1, wherein the link mechanism includes:
   an upper link having a front end portion supported so as to be swingable up and down about an upper pivotal support axis by a link support section formed on the vehicle body, and a rear end portion coupled to the wheel support member so as to be swingable about an upper coupling axis relative to the wheel support member; and a lower link having a front end portion supported by the link support section so as to be swingable up and down about a lower pivotal support axis, and a rear end portion coupled to the wheel support member so as to be swingable about a lower coupling axis relative to the wheel support member.

7. The work vehicle according to claim 1, wherein an upper link is supported by the link support section via a first elastic member, and wherein a lower link is supported by the link support section via a second elastic member.

8. The work vehicle according to claim 1, wherein an upper link is supported by the wheel support member via a first elastic member, and wherein a lower link is supported by the wheel support member via a second elastic member.

\* \* \* \* \*

UNITED STATES PATENT AND TRADEMARK OFFICE
CERTIFICATE OF CORRECTION

PATENT NO. : 11,458,790 B2
APPLICATION NO. : 17/111242
DATED : October 4, 2022
INVENTOR(S) : Masahiro Azuma It is certified that error appears in the above-identified patent and that said Letters Patent is hereby corrected as shown below:

In the Claims

Column 10, Line 20, Claim 1, after "(1)" insert -- , --

Column 10, Line 21, Claim 1, delete "0" and insert -- $\theta$ --

Column 10, Line 42, Claim 4, delete "α=tan-1" and insert -- $\alpha=\tan^{-1}$ --

Column 10, Line 42, Claim 4, after "(4)" insert -- , --

Column 10, Line 55, Claim 5, after "(5)" insert -- , --

Signed and Sealed this
Twentieth Day of December, 2022

*Katherine Kelly Vidal*
Katherine Kelly Vidal
*Director of the United States Patent and Trademark Office*